Jan. 2, 1923.

R. KAIN.
DAMPER LOCKING DEVICE.
FILED JAN. 17, 1920.

1,440,921.

Inventor
Robert Kain
By his Attorney

Patented Jan. 2, 1923.

1,440,921

UNITED STATES PATENT OFFICE.

ROBERT KAIN, OF CLEVELAND, OHIO, ASSIGNOR TO THE KAIN & AUNGER COMPANY, A CORPORATION OF OHIO.

DAMPER-LOCKING DEVICE.

Application filed January 17, 1920. Serial No. 352,018.

*To all whom it may concern:*

Be it known that I, ROBERT KAIN, a citizen of the United States, residing at Cleveland, in the county of Cuyahoga and State of Ohio, have invented certain new and useful Improvements in Damper-Locking Devices, of which the following is a specification.

This invention relates to damper locking devices and has for its principal object to provide a simple means for indicating the position of a damper and for locking the same so that it may not be operated except by an authorized person having a special key or wrench.

With the above and other objects in view as will be readily understood, the invention will be hereinafter fully described as illustrated in the accompanying drawings, and the novel features thereof will be distinctly pointed out in the appended claims.

In the drawings similar characters of reference are used to indicate corresponding parts.

Figure 1:
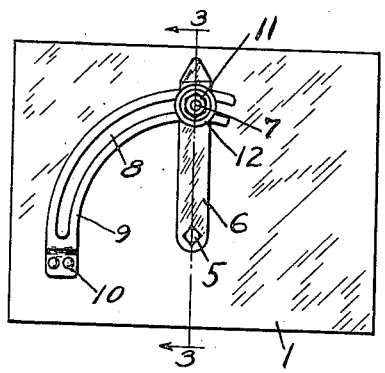
Figure 1 is a side elevation of a flue with my invention applied thereto.
Figure 2:
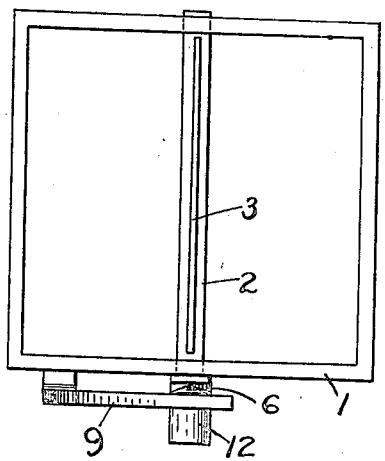
Figure 2 is a plan view of the same.
Figure 3:
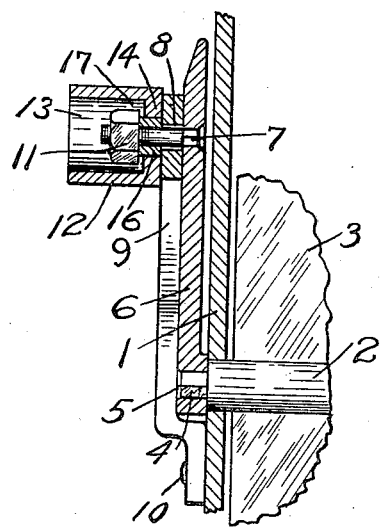
Figure 3 is a sectional view, on an enlarged scale, taken on line 3—3 of Fig. 1.
Figure 4:
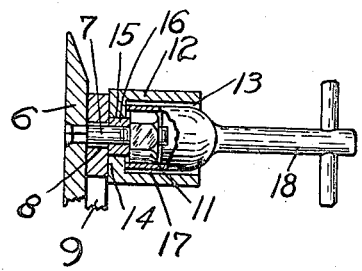
Figure 4 is a sectional view illustrating the locking means with key applied thereto, and, Figure 5 is a front view of the locking means.
Figure 5:
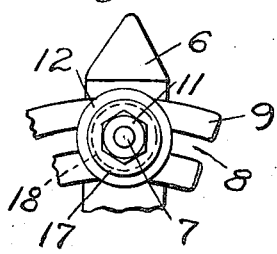

Referring to the drawings, 1 represents a furnace pipe flue having therein a rotatably mounted rod 2 carrying a damper 3. A reduced end of the damper rod 2 is square as at 4 beyond the wall of the flue 1, and fixed thereto by riveting at 5 is an indicating arm 6, which is arranged to swing in the same plane with the damper 3. Projecting from the face of and fixed to the indicating arm 6 is a pin 7, which is adapted to travel in a curved slot 8 of a quadrant member 9 securely attached to the wall of the flue 1 at 10. For holding the indicating arm 6 to the quadrant member 9 in a set position, a nut 11 is mounted upon the threaded end of the pin 7 for binding said arm to said member.

By the construction as described, it is easy for an unauthorized person to turn the nut 11 by means of an ordinary wrench, thus releasing the indicating arm 6 and making it possible to change the position of the damper 3. In order to prevent an unauthorized person tampering with the damper, a hollow button 12, having an open end 13 and a closed end 14 provided with an opening 15 for receiving a bushing or sleeve 16 through which the pin 7 freely passes, is loosely mounted upon said pin for encircling the nut 11. The hollow button 12 is preferably cylindrical in shape and is of sufficient size to leave a space 17 between the inner sides thereof and the sides of the nut 11 to permit the use only of a special wrench, such as indicated by 18, for turning said nut. The bushing or sleeve 16 is slightly longer than the thickness of the closed end 14 of the hollow button 12, so that the nut 11 engages the same and leaves the hollow button free to rotate thereupon without turning said nut.

From the drawings and description it is obvious than an unauthorized person not having the special key or wrench could not tamper with the damper to change its position.

Having fully described my invention, what I claim is:

1. In a damper locking device, the combination of a damper, an arm movable with the damper, a quadrant member, a pin fixed in the arm, the pin being threaded at its outer end, a nut on the pin for locking said arm to said member, means for turning the nut, and rotatably mounted means enclosing said nut for permitting the use only of said first mentioned means for turning the nut, substantially as described.

2. In a damper locking device, the combination of a damper, an arm movable with the damper, a quadrant member, a pin fixed in the arm, the pin being threaded at its outer end, a nut on the pin for locking said arm to said member, a key for turning the nut, and a hollow button rotatably mounted relative to said pin and enclosing said nut for limiting the use of other than said key for turning the nut, substantially as described.

3. In a damper locking device, the combination of a damper, an arm movable with the damper, a quadrant member, a pin fixed in the arm, the pin being threaded at its outer end, a nut on the pin for locking said arm to said member, a key for turning the nut, a hollow button having a closed end and an open end, the closed end of the hollow button being provided with an opening for receiving said pin, and the hollow button being rotatably mounted relative to and surrounding said nut to limit the space for the use of said key with said nut, substantially as described.

4. In a damper locking device, the combination of a damper, an arm movable with the damper, a quadrant member, a pin fixed in the arm, the pin being threaded at its outer end, a sleeve on the pin, a hollow button having a closed end and an open end, the closed end of the hollow button being provided with an opening for receiving said sleeve, the sleeve being longer than the thickness of the closed end of the hollow button, the hollow button being rotatably mounted upon said sleeve, the pin being threaded, a nut on the pin for engaging said sleeve to lock said arm to said member, and means for turning said nut when within said hollow button, substantially as described.

In testimony whereof I affix my signature.

ROBERT KAIN.